United States Patent
Rose et al.

(10) Patent No.: US 10,908,477 B2
(45) Date of Patent: Feb. 2, 2021

(54) ULTRASONIC/ACOUSTIC CONTROL OF LIGHT WAVES FOR LEFT-RIGHT OPTICAL REFLECTION ASYMMETRY

(71) Applicant: The Penn State Research Foundation, University Park, PA (US)

(72) Inventors: Joseph L. Rose, State College, PA (US); Akhlesh Lakhtakia, State College, PA (US)

(73) Assignee: The Penn State Research Foundation, University Park (PA)

( * ) Notice: Subject to any disclaimer, the term of this patent is extended or adjusted under 35 U.S.C. 154(b) by 30 days.

(21) Appl. No.: 16/092,044

(22) PCT Filed: Apr. 8, 2017

(86) PCT No.: PCT/US2017/026730
§ 371 (c)(1),
(2) Date: Oct. 8, 2018

(87) PCT Pub. No.: WO2017/177213
PCT Pub. Date: Oct. 12, 2017

(65) Prior Publication Data
US 2019/0163031 A1    May 30, 2019

Related U.S. Application Data

(60) Provisional application No. 62/320,206, filed on Apr. 8, 2016.

(51) Int. Cl.
*G02F 1/335* (2006.01)
*G02B 6/34* (2006.01)
(Continued)

(52) U.S. Cl.
CPC .............. *G02F 1/335* (2013.01); *G02B 6/00* (2013.01); *G02B 6/34* (2013.01); *G02F 1/035* (2013.01);
(Continued)

(58) Field of Classification Search
None
See application file for complete search history.

(56) References Cited

U.S. PATENT DOCUMENTS 3,743,970 A * 7/1973 Bonner .................. C30B 15/00
359/305
4,734,578 A   3/1988 Horikawa
(Continued)

FOREIGN PATENT DOCUMENTS

EP        0485191 A2    5/1992

OTHER PUBLICATIONS

Machihin, A.S. & Pozhar, V.E., Spatial and spectral image distortions caused by diffraction of an ordinary polarised light beam by an ultrasonic wave, Quantum Electronics, 2015, vol. 45, No. 2, pp. 161-165.

*Primary Examiner* — Chad H Smith
(74) *Attorney, Agent, or Firm* — Hodgson Russ LLP

(57) ABSTRACT

Methods and systems of altering optical reflection via dynamic control of an ultrasonic/acoustic guided wave field in an acousto-optical wave conductor are described. Ultrasonic/acoustic waves transmitted by an acousto-optical wave conductor are used to modify the ability of the acousto-optical wave conductor to propagate light waves via the acousto-optical wave conductor when a light beam
(Continued)

a.) Rayleigh surface wave (on the surface decaying with depth) displacement components in both x and y directions.

b.) Lamb wave (displacement components in both x and y directions).

c.) Shear horizontal wave mode propagation, where the propagation is along $x_1$ direction and particle displacements are along $x_3$ direction.

impinges onto one surface of the acousto-optical wave conductor. A one-way optical device may be produced by using a dynamic tuning approach to modify the sound field via mode and frequency choice (and possibly beam focusing and steering as well) in order to produce special light reflection and transmission effects. Oscillations in stress (and mass density) along the acousto-optical wave conductor and possibly across the thickness of the acousto-optical wave conductor may serve as a special acousto-optic Bragg diffraction grating that alters the nonspecular reflection of light.

34 Claims, 17 Drawing Sheets

(51) Int. Cl.
  *G02F 1/035* (2006.01)
  *G02F 1/125* (2006.01)
  *G02F 1/11* (2006.01)
  *G02F 1/33* (2006.01)
  *G02B 6/00* (2006.01)
(52) U.S. Cl.
  CPC .............. *G02F 1/11* (2013.01); *G02F 1/125* (2013.01); *G02F 1/33* (2013.01); *G02F 2201/305* (2013.01)

(56) References Cited

U.S. PATENT DOCUMENTS

| | | |
|---|---|---|
| 4,991,923 A | 2/1991 | Kino et al. |
| 5,129,262 A | 7/1992 | White et al. |
| 5,452,314 A | 9/1995 | Aronson |
| 5,630,004 A | 5/1997 | Deacon et al. |
| 5,631,762 A | 5/1997 | Kataoka |
| 6,069,698 A | 5/2000 | Ozawa et al. |
| 6,236,492 B1 | 5/2001 | Kump |
| 6,411,748 B1 * | 6/2002 | Foltzer .................. G02F 1/125 385/10 |
| 6,882,374 B2 | 4/2005 | Numakoshi |
| 7,054,055 B2 | 5/2006 | Shibuya et al. |
| 7,548,364 B2 * | 6/2009 | Jennings ................. G02F 1/11 359/285 |
| 7,733,742 B2 | 6/2010 | Gross et al. |
| 9,188,953 B2 | 11/2015 | Maeng et al. |
| 2001/0046052 A1 | 11/2001 | Toida |
| 2004/0150309 A1 | 8/2004 | Donovan et al. |
| 2008/0037100 A1 | 2/2008 | Minemoto et al. |
| 2009/0147344 A1 | 6/2009 | Lovering et al. |
| 2010/0032555 A1 | 2/2010 | MacDonald et al. |
| 2010/0134867 A1 * | 6/2010 | Gugel ............... G02B 21/0064 359/287 |
| 2014/0007688 A1 | 1/2014 | Sangawa et al. |
| 2014/0121490 A1 | 1/2014 | Hashimoto et al. |
| 2014/0371590 A1 | 12/2014 | Urano et al. |
| 2016/0209594 A1 * | 7/2016 | Bahl ..................... G10K 11/18 |

* cited by examiner a.) Rayleigh surface wave (on the surface decaying with depth) displacement components in both x and y directions.

b.) Lamb wave (displacement components in both x and y directions).

c.) Shear horizontal wave mode propagation, where the propagation is along $x_1$ direction and particle displacements are along $x_3$ direction.

15a

15b

ULTRASONIC/ACOUSTIC CONTROL OF LIGHT WAVES FOR LEFT-RIGHT OPTICAL REFLECTION ASYMMETRY

CROSS-REFERENCE TO RELATED APPLICATION

This application claims the benefit of priority to U.S. provisional patent application Ser. No. 62/320,206, filed on Apr. 8, 2016.

FIELD OF THE INVENTION

The present invention relates to devices/systems/methods of controlling the transmission of an electromagnetic wave through an acousto-optical plate using an ultrasonic/acoustic wave.

BACKGROUND OF THE INVENTION

Acousto-optics is associated with the study of the interaction of light waves and ultrasonic/acoustic waves. The ability of these two types of waves to interact was experimentally confirmed in 1932 by Debye and Sears, as well as by Lucas and Biquard. Raman and Nath in 1935-1936 presented some insightful modeling concepts on the diffraction of light by high frequency sound waves, thereby laying a scientific foundation for the field of acousto-optics. Mueller in 1937 showed that supersonic waves in crystals can function as diffraction gratings for light. Pierce and Byer in 1972 described an experiment to observe both Raman-Nath and Bragg diffraction of light by ultrasonic/acoustic waves in water over the frequency range of 5 to 45 MHz. Whereas Raman-Nath diffraction occurs at ultrasonic/acoustic frequencies not exceeding 10 MHz and alters the optical frequency by multiples of the ultrasonic/acoustic frequency, Bragg diffraction occurs at higher ultrasonic/acoustic frequencies and preserves the optical frequency. Kersemans et al. in 2011 generated leaky Lamb waves in liquids whereby light waves are diffracted in the liquid. The diffracted light can be imaged on a suitable screen, thereby providing evidence of the existence of pressure variations accompanying the ultrasonic/acoustic wave. A high-frequency (>20 MHz) ultrasonic/acoustic wave of sufficiently high intensity passing through an optically transparent solid medium (such as glass or quartz) presents a diffraction grating to an optical plane wave (or light beam) incident on it. The consequent Bragg diffraction of the optical plane wave is used in acousto-optic deflectors, filters, and modulators.

Research on the acousto-optic effect has made use of simplified bulk-wave ultrasonic/acoustic fields. If a spatially complex ultrasonic/acoustic field, such as a specially controlled ultrasonic/acoustic guided wave field, is launched inside an optically transparent solid plate (called the acousto-optical plate in the remainder of this patent application), Bragg diffraction into different orders can be used to obtain bilaterally asymmetric reflection of light. Thus, light impinging from the left and the right on the acousto-optical plate has unequal reflection, whether in the specular order or a preset nonspecular order. With multiple sources to excite a multitude of guided ultrasonic/acoustic waves with sufficiently high intensities and of frequencies above about 20 MHz, a complex sound field can be created as a result of mode and frequency choice and beam steering or focusing in the plate. Additionally, the top surface of the acousto-optical plate could be laser micromachined for an asymmetric and periodic texture. The bottom surface of the acousto-optical plate could be either backed by or bonded to a planar reflective plate, which may either be made of a metal or be a multilayered dielectric reflector of finite thickness designed to exploit the Bragg law (as is commonly done for devices such as laser mirrors in optics).

SUMMARY OF THE INVENTION

The invention may be embodied as a system for creating a diffraction grating. Such a system may have:
    an acousto-optical wave conductor that is capable of transmitting both ultrasonic/acoustic waves and electromagnetic waves (an "acousto-optical wave conductor");
    an electromagnetic wave source arranged to provide to the acousto-optical wave conductor an electromagnetic wave having a frequency of between 0.8 and 300 THz; and
    an ultrasonic/acoustic wave generator arranged to provide to the acousto-optical wave conductor an ultrasonic guided wave having a frequency of between 20 and 5000 MHz.
The acousto-optical wave conductor may be provided in the form of a plate. The ultrasonic/acoustic wave generator may be arranged to cause the ultrasonic guided wave to have a propagation direction that is transverse to the propagation direction of the electromagnetic wave. In use, an electromagnetic wave may be permitted to propagate through the acousto-optical wave conductor in a first direction, but not in a second direction.

The electromagnetic wave source may produce an electromagnetic wave that has a frequency of between 0.8 and 6 THz, and the ultrasonic/acoustic wave generator may produce an ultrasonic guided wave that has a frequency of between 20 and 100 MHz. For example, the electromagnetic wave may have a frequency of between 0.8 and 3.0 THz, and the ultrasonic guided wave may have a frequency of between 20 and 50 MHz. Or, the electromagnetic wave may have a frequency of between 6 and 30 THz, and the ultrasonic guided wave may have a frequency of between 100 and 500 MHz. Or, the electromagnetic wave may have a frequency of between 30 and 300 THz, and the ultrasonic guided wave may have a frequency of between 500 and 5000 MHz.

The ultrasonic guided wave may be (a) a Rayleigh surface wave, (b) a Lamb-type wave, or (c) a shear-horizontal guided wave.

The ultrasonic guided wave generator may be an angle-beam excitor, a comb excitor, or some other excitor.

Dynamic control of the ultrasonic/acoustic wave may be used to alter the ability of the acousto-optical wave conductor to conduct the electromagnetic wave. For example, dynamic control of the ultrasonic guided wave may be used to selectively cause density variations in the acousto-optical wave conductor in order to reflect, refract, or diffract the electromagnetic wave.

The acousto-optical wave conductor may be backed by a metal plate.

A surface of the acousto-optical wave conductor that is arranged to receive the electromagnetic wave may be textured in a periodic way along one direction, or in a periodic way along two mutually orthogonal directions.

The invention may be embodied as a method of creating a diffraction grating. For example, such a method may provide an acousto-optical wave conductor, provide an electromagnetic wave to the acousto-optical wave conductor, and provide an ultrasonic guided wave to the acousto-optical wave conductor. The electromagnetic wave may have a frequency of between 0.8 and 300 THz, and the ultrasonic guided wave may have a frequency of between 20 and 5000 MHz in order to alter the optical-transmission characteristics of the acousto-optical wave conductor. The ultrasonic guided wave may be caused to propagate in a direction that is transverse to a propagation-direction of the electromagnetic wave. By controlling the ultrasonic guided wave, the electromagnetic wave may be permitted to propagate through the acousto-optical wave conductor in a first direction, but not in a second direction. The ultrasonic guided wave may be dynamically controlled to selectively alter the ability of the acousto-optical wave conductor to conduct the electromagnetic wave. For example, the ultrasonic guided wave may be dynamically controlled to selectively cause density variations in the acousto-optical wave conductor in order to reflect, refract, and/or diffract the electromagnetic wave.

In such methods, the electromagnetic wave may have a frequency of between 0.8 and 6 THz, and the ultrasonic guided wave may have a frequency of between 20 and 100 MHz. The electromagnetic wave may have a frequency of between 0.8 and 3.0 THz, and the ultrasonic guided wave may have a frequency of between 20 and 50 MHz. The electromagnetic wave may have a frequency of between 6 and 30 THz, and the ultrasonic guided wave may have a frequency of between 100 and 500 MHz. The electromagnetic wave may have a frequency of between 30 and 300 THz, and the ultrasonic guided wave may have a frequency of between 500 and 5000 MHz.

In such methods, the ultrasonic guided wave may be a Rayleigh surface wave, or a Lamb-type wave, or a shear-horizontal guided wave. The ultrasonic guided wave generator may be an angle-beam excitor, or may be a comb excitor.

In such methods:
a surface of the acousto-optical wave conductor that receives the electromagnetic wave may be textured in a periodic way along one direction and/or
a surface of the acousto-optical wave conductor that receives the electromagnetic wave may be textured in a periodic way along two mutually orthogonal directions.

BRIEF DESCRIPTION OF THE DRAWINGS

The electromagnetic properties of a dielectric material depend on the polarization field induced inside that material due to an exciting electric field. The polarization field is the volumetric density of induced electric dipoles. Therefore, fluctuations of mass density, caused for example by an ultrasonic/acoustic wave, may affect the passage of an electromagnetic wave though a polarized dielectric material.

For a fuller understanding of the nature and objects of the invention, reference should be made to the accompanying drawings and the subsequent description. Briefly, the drawings are:

FIG. 2 depicts two methods of introducing guided ultrasonic/acoustic waves into an acousto-optical wave conductor 10 that is in the form of a plate. An ultrasonic/acoustic wave generator 30 is shown in FIG. 2a. FIG. 2a depicts angle-beam excitation, and FIG. 2b depicts comb excitation. These two guided-wave methods can cover the total thickness and a large volume of the plate. Use of the angle-beam method at a predetermined angle and frequency can produce a desired stress and density field at various positions in the plate. In the case of a comb-transducer excitation, the piezoelectric element spacing is the same as the wavelength associated also with a frequency used to generate appropriate guided ultrasonic/acoustic waves. Multiple elements are pulsed in the comb transducer either in phase or out of phase to generate specific points in the phase velocity dispersion curve space.

FIGS. 15a and 15b show a top fade which is planar, and FIGS. 15c and 15d show a top face that is laser micromachined. Different guided ultrasonic/acoustic waves may be launched for optical plane waves impinging from the left and right quadrants.

The electromagnetic wave may have a frequency of between 0.8 and 300 THz. The ultrasonic guided wave may have a frequency of between 20 and 5000 MHz.

FURTHER DESCRIPTION OF THE INVENTION

The present disclosure sets forth methods and systems for altering optical reflection via dynamic control of an ultrasonic/acoustic guided wave field in an acousto-optical transparent plate. A novel route is proposed here to exploit asymmetric excitation of guided waves for left-right reflection asymmetry with regard to electromagnetic waves at and above approximately 0.8 THz. That route may use acousto-optical interactions in a transparent solid plate with an asymmetrically dynamic ultrasonic/acoustic guided wave field control approach to a plain surface or laser micromachined surface.

Figure 15:
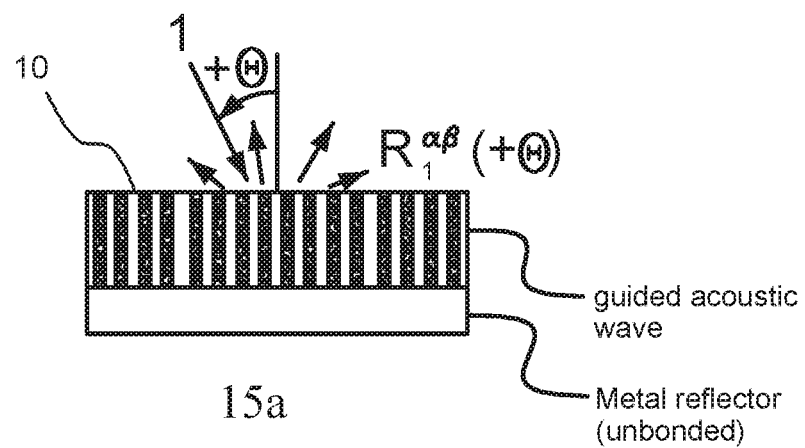
FIG. 15 has four schematics each showing bilateral asymmetric nonspecular optical reflection due to acousto-optical interactions in a solid plate.
Figure 15:
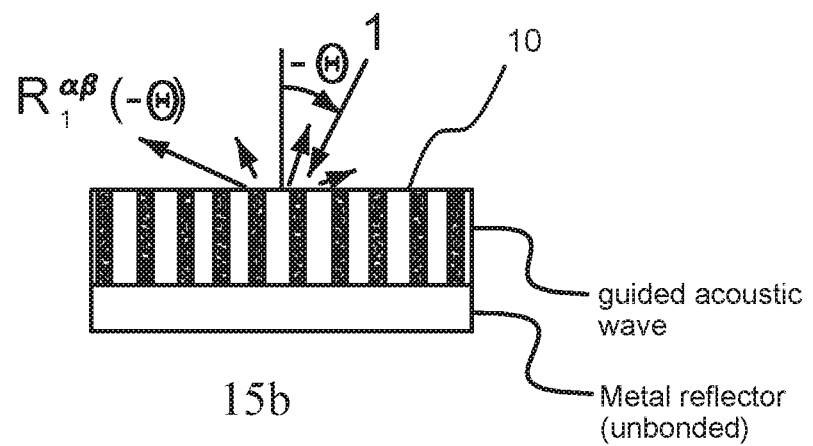
Figure 15:
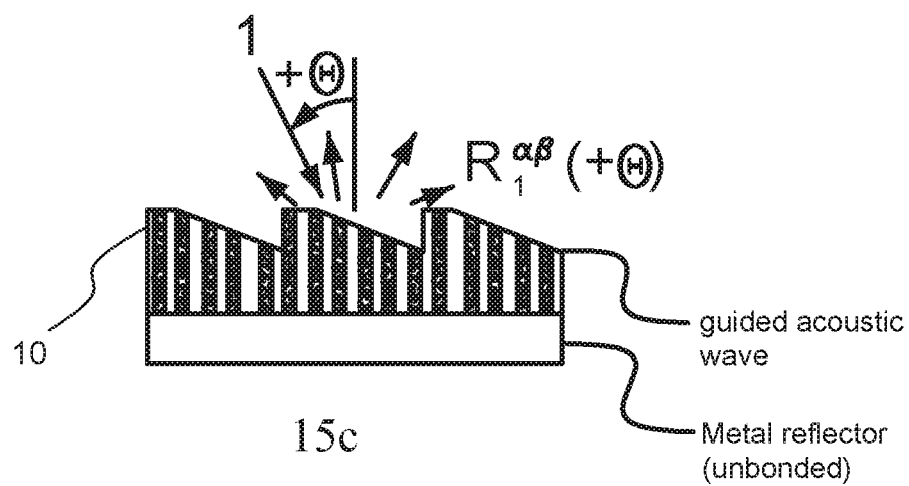
Figure 15:
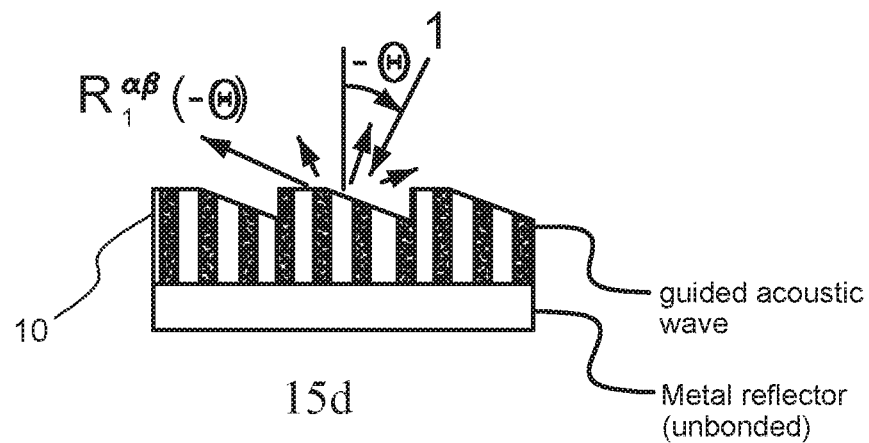
Figure 16:
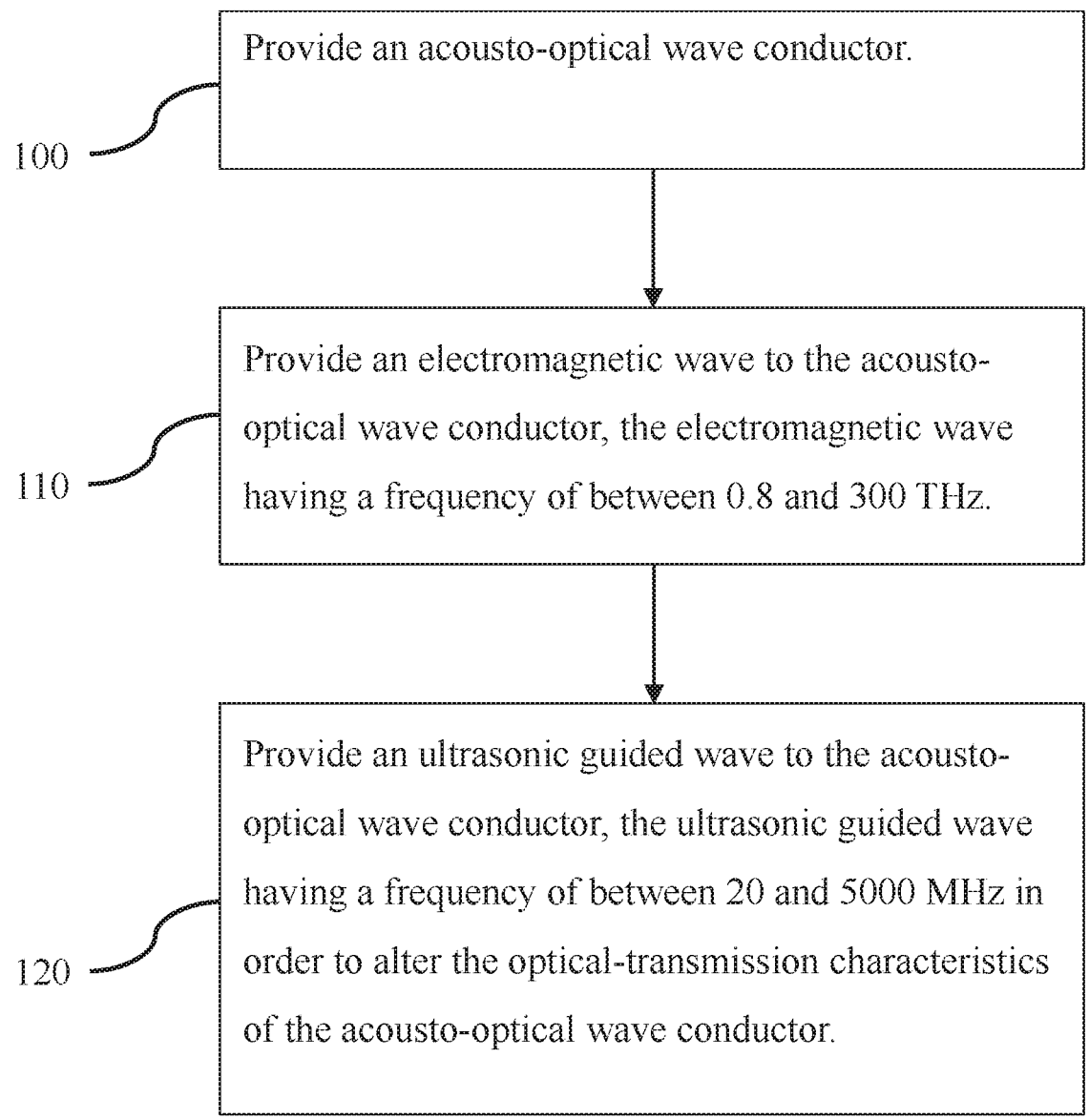
FIG. 16 depicts a method according to an embodiment of the invention. In that method,
- an acousto-optical wave conductor, such as soda-lime glass, is provided 100;
- an electromagnetic wave, such as a light wave, is provided 110 to the acousto-optical wave conductor (e.g. "plate"); and
- an ultrasonic guided wave is provided 120 to the acousto-optical wave conductor in order to alter the optical-transmission characteristics of the acousto-optical wave conductor.

Rather than by a fixed grating alone, the approach presented here is based on dynamic control, that is, to alter light reflection characteristics by changing the ultrasonic/acoustic field (guided ultrasonic/acoustic wave) in a plate so that a first optical plane wave impinging from the left quadrant, and a second optical plane wave impinging from the right quadrant may be diffracted differently, as in FIG. 15(a). Laser micromachining of the top surface of the plate, as in FIG. 15(b), may provide additional enhancement of left-right optical reflection asymmetry. Furthermore, the guided ultrasonic/acoustic waves may be set to propagate along both x and y directions. The choices of guided ultrasonic/acoustic wave modes, as well as of their frequencies and phases, may be important in enabling left-right optical reflection asymmetry.

Ultrasonic/acoustic guided waves are generated in a transparent acousto-optical plate to modify the propagation of light waves launched inside the plate when a light beam impinges onto a surface of the plate. A one-way optical device can be produced by using a dynamic tuning approach to modify the sound field via mode and frequency choice (and possibly beam focusing and steering as well) in order to produce desired light reflection and transmission effects. Oscillations in stress (and mass density) along a fixed direction in the acousto-optical plate and possibly across the thickness of that plate may serve as a special acousto-optic Bragg diffraction grating that results in nonspecular reflection of light. As an example, the 20-50 MHz ultrasonic/acoustic frequency range corresponds approximately to the 0.8-3.0 THz electromagnetic frequency range, with some latitude that depends on the materials used.

Optical waves can traverse space having an ultrasonic/acoustic field, such that the small variations in light wave velocity that occur when encountering pressure variations caused by the ultrasonic/acoustic field produce a sound field image when the light is projected onto a flat reflective screen or appropriate light wave camera. A sound field image could show different variables such as certain stress components, displacement components, and density. When a beam of light passes through a transparent solid medium that has ultrasonic/acoustic waves propagating in the transparent medium transverse to the light beam, diffraction of the light will occur if the mode choice and frequency of the ultrasonic/acoustic wave is properly selected. The incident light hits a plain surface first in FIG. 11, whereas it hits a diffraction grating first in FIG. 12. Our invention is focused on diffracting a light beam by using a more complex sound field generated by an ultrasonic/acoustic guided wave field inside a transparent solid plate. Oscillations in stress (and mass density) along the plate and possibly across the thickness of the plate may serve as a diffraction grating so as to alter the propagation of light as it is transmitted through and/or reflected from the plate. Using these techniques, left-right asymmetry of optical reflection from the acousto-optical plate can be achieved, and thus one-way optical devices may be created. This left-right reflection asymmetry may be manifested through either the specular or a nonspecular order in the reflected light.

A dynamic tuning approach can be used to modify the ultrasonic/acoustic field via mode and frequency choice (and possibly beam focusing and steering as well), in order to produce light reflection and transmission that is appropriate for optical left-right reflection asymmetry. It is expected that an ultrasonic/acoustic frequency in the band from 20 to 100 MHz may be used to affect an electromagnetic wave having a frequency in the range of 0.8 to 6 THz, depending on the material of the acousto-optical plate. In theory, a wider frequency band could be considered depending on the availability of ultrasonic/acoustic equipment operating at frequencies higher than 100 MHz. It is believed that the invention may be suitable for higher frequencies, including electromagnetic frequencies in the range of 6 THz to 30 THz, which corresponds to an ultrasonic/acoustic frequency range of approximately to 100 MHz to 500 MHz. In theory, it should be possible to implement the invention for electromagnetic frequencies up to 300 THz, which corresponds to an ultrasonic/acoustic frequency of approximately 5000 MHz.

Figure 1:
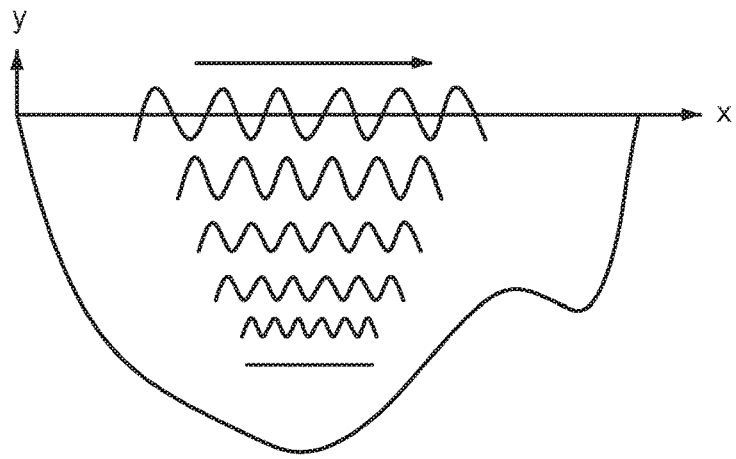
FIG. 1 has three schematics each depicting a different type of wave. Schematic "a" depicts a Rayleigh surface wave (on the surface decaying with depth) with displacement components along both the x and y directions. Schematic "b" depicts a Lamb wave with displacement components along both the x and y directions. Schematic "c" depicts Shear horizontal wave mode propagation, where the propagation is along the $x_1$ direction and particle displacements are along the $x_3$ direction.
Figure 1:
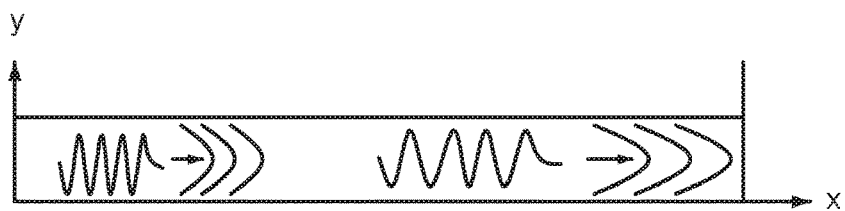
Figure 1:
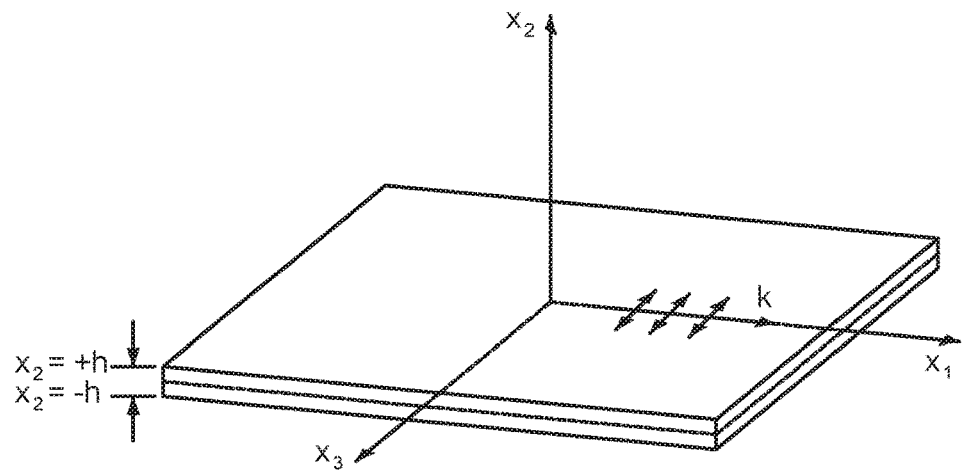
Figure 2:
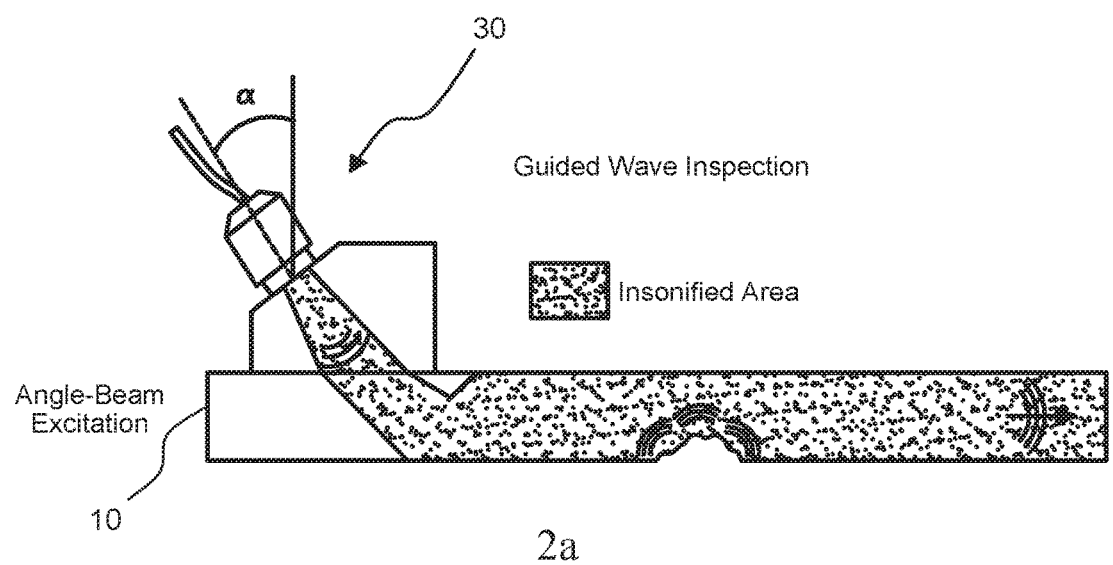
Figure 2:
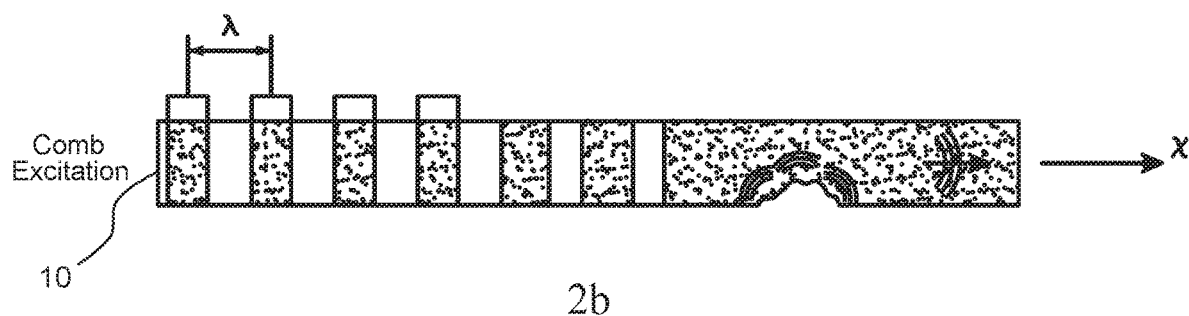
Figure 3:
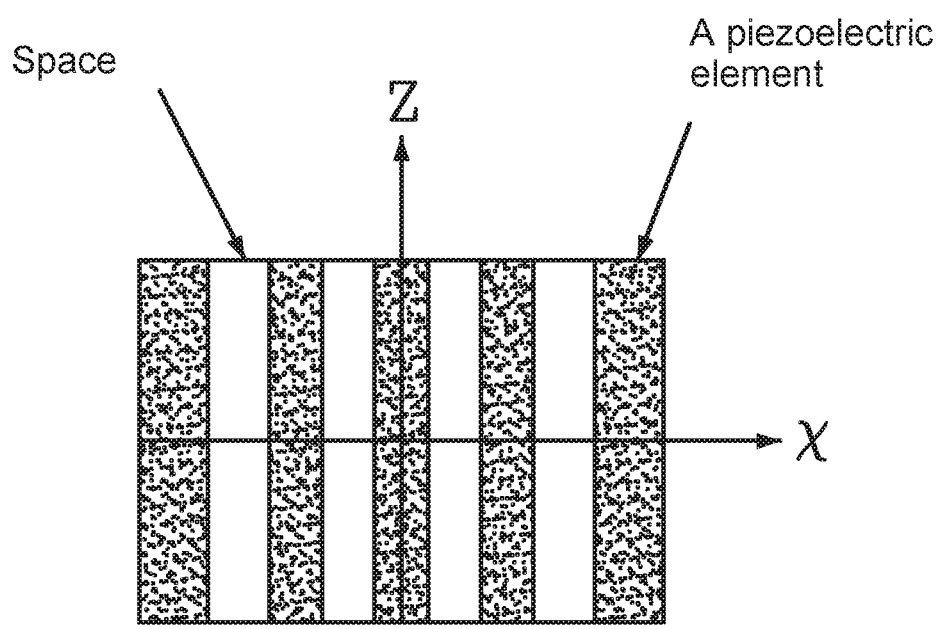
FIG. 3 depicts a comb actuator (see FIG. 2b) to be placed in contact with a plate to produce ultrasonic/acoustic waves traveling in the x direction.
Figure 4:
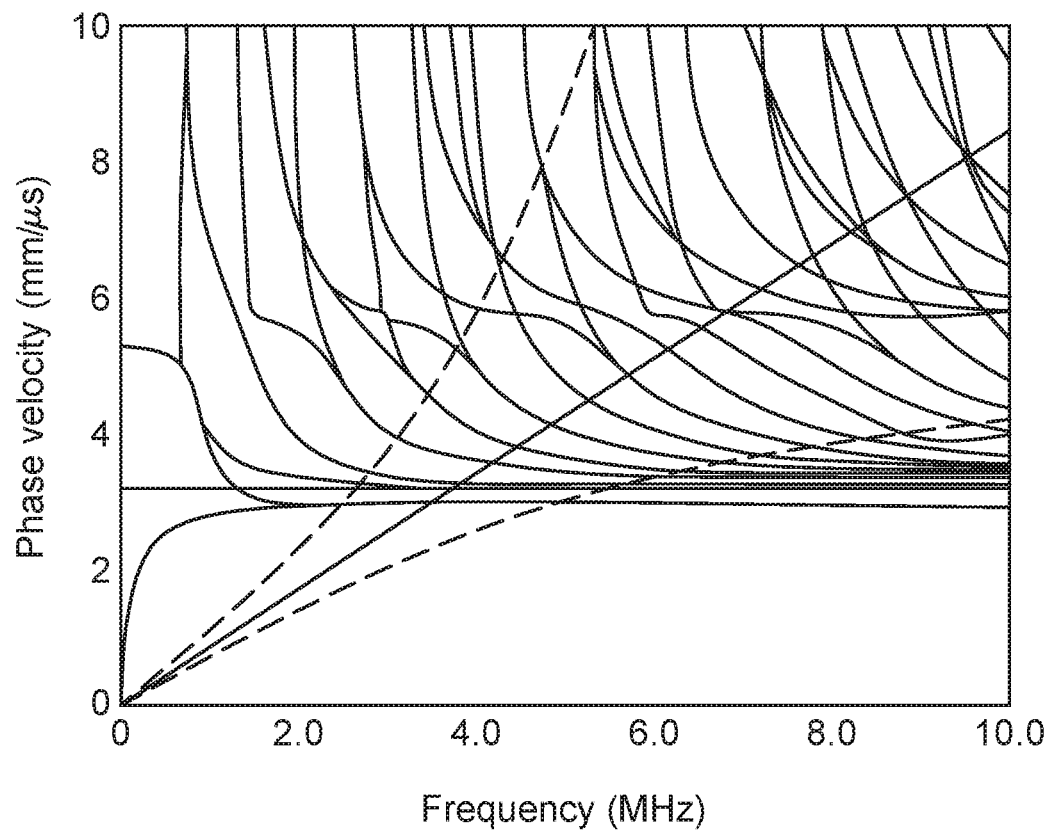
FIG. 4 depicts conceptual activation lines for a linear, multi-element comb transducer with in-phase (thick solid line) and 1 µs linear time delay (dashed curved lines) element excitation. Both dashed lines result from the time delay: one in one direction, and the other in the opposite direction.

Shown in FIG. 1 are three types of ultrasonic/acoustic guided waves including (a) Rayleigh surface waves, (b) Lamb type waves, and (c) shear horizontal ("SH") guided waves. FIG. 2 illustrates how ultrasonic/acoustic guided waves can be generated in a plate. Either angle beam excitation or comb excitation may be possible. Comb excitation provides more flexibility in that phasing becomes possible for mode control. A schematic of a comb actuator is shown in FIG. 3. The phasing concept over the piezoelectric elements can be used to control mode selection as illustrated in FIG. 4. Following the description of a comb transducer in FIG. 3, the solid line in FIG. 4 shows an activation line for a fixed spacing λ, which is the slope of phase velocity over frequency. If time delays are applied across the elements pulsing one at a time with subsequent time delays of 1 µs in this example, the two dashed lines become the activation lines. One is for waves traveling to the right and the other for waves traveling to the left. In order to select a specific point, therefore in the phase velocity dispersion curve space shown, a certain frequency can be selected and the corresponding phase velocity will fall on the desired activation line. The specific point chosen provides us with a desired sound field for the incoming light ray to impinge upon at a specific point in the test plate. Phasing, combined with ultrasonic/acoustic frequency choice, allows us to infuse a region of interest with an ultrasonic/acoustic guided wave with a specific spatial profile. It also becomes possible by additional superimposed phasing using a series of actuators to focus or steer the ultrasonic/acoustic wave in the plate, and this may be used, for example, to produce higher energy in the plate. For details on ultrasonic guided wave propagation, see the book by one of the authors of this patent application, *Ultrasonic Guided Waves in Solid Media*, Joseph L. Rose, Cambridge University Press, 2014.

Figure 5:
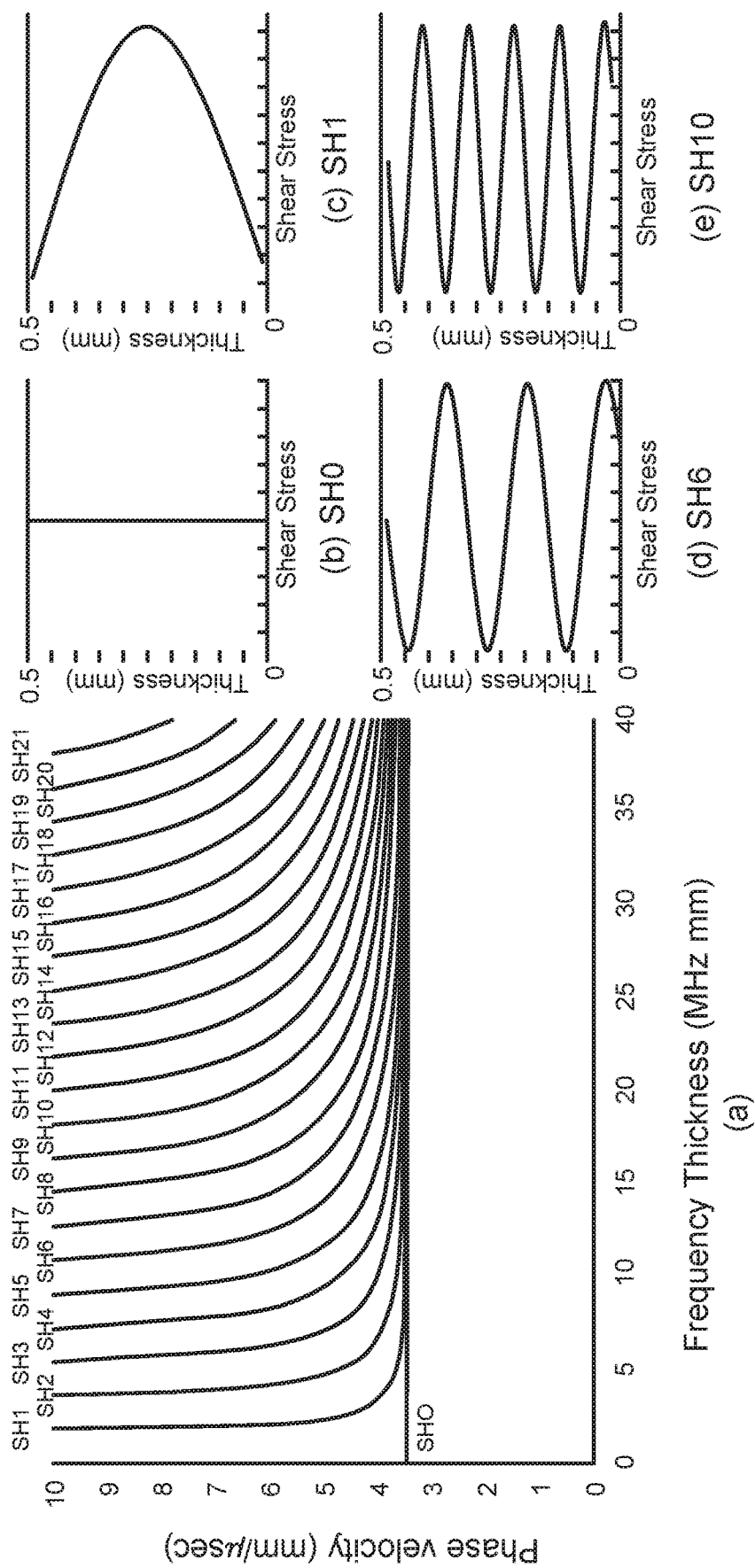
FIG. 5a depicts dispersion curves and FIG. 5b-5e depict shear stress wave structures of shear horizontal (SH) waves in a 0.5-mm-thick soda lime glass plate. The material properties of soda-lime glass at 20° C. are: mass density=2.52 kg/m$^3$, Young's modulus E=72 GPa, and shear modulus G=29.8 GPa.
Figure 6:
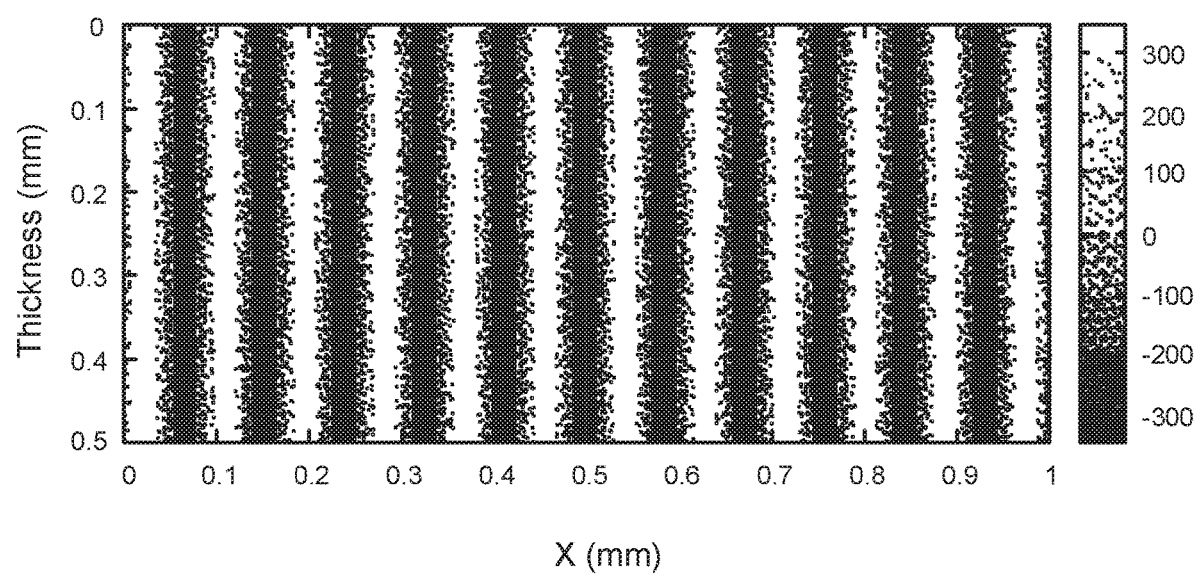
FIG. 6 depicts shear stress distribution of continuous 40-MHz SH0 waves in a 0.5-mm-thick soda lime glass plate. The wavelength of 40-MHz SH0 waves is 86 micrometers.
Figure 7:
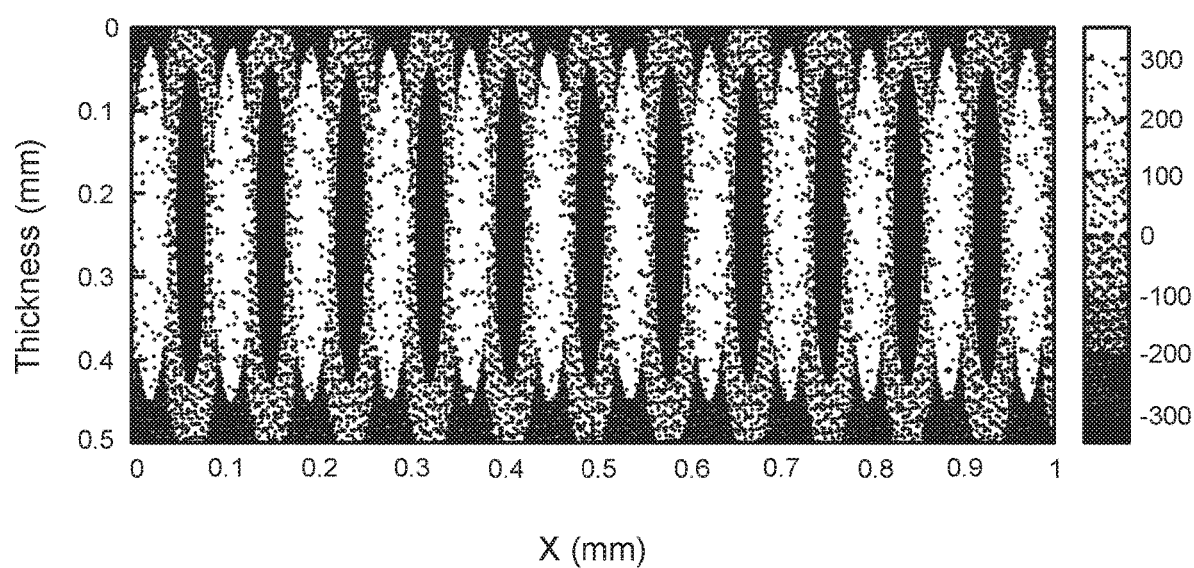
FIG. 7 depicts shear stress distribution of continuous 40-MHz SH1 waves in a 0.5-mm-thick soda lime glass plate. The wavelength of 40-MHz SH1 waves is 86 micrometers.
Figure 8:
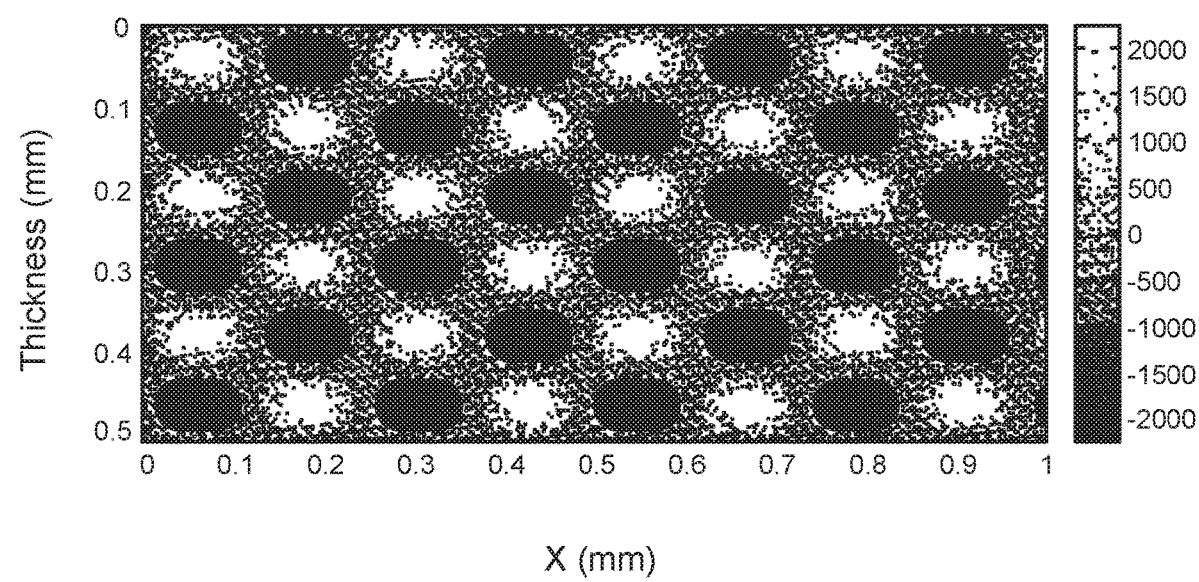
FIG. 8 depicts shear stress distribution of continuous 25-MHz SH6 waves in a 0.5-mm-thick soda lime glass plate. The wavelength of 25-MHz SH6 waves is 244 micrometers, and the wavelength of 40-MHz SH6 waves is 100 micrometers.
Figure 9:
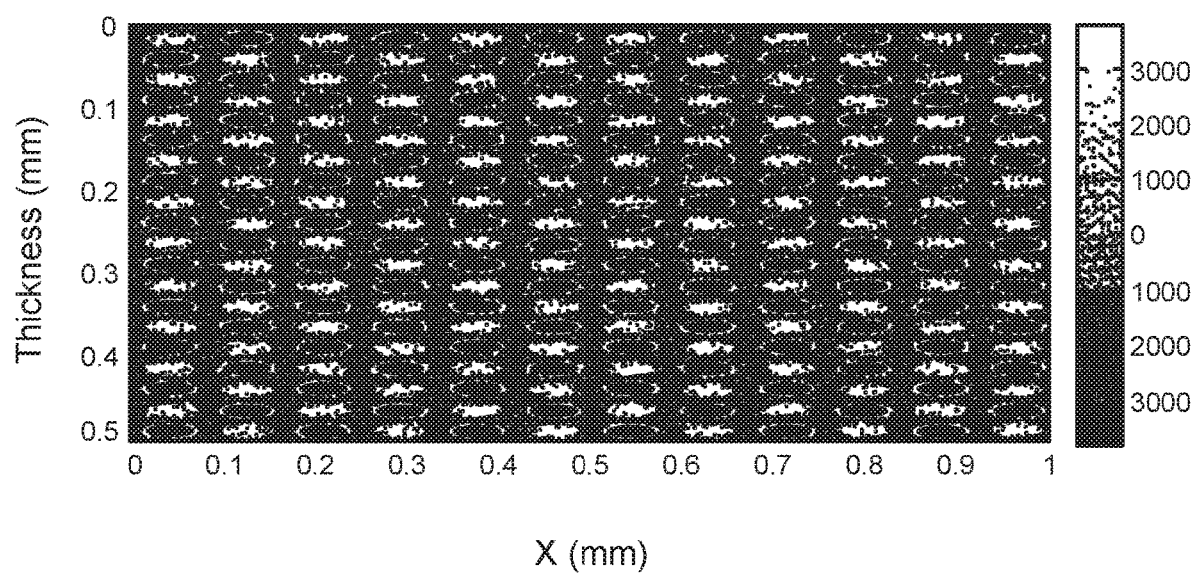
FIG. 9 depicts shear stress distribution of continuous 40-MHz SH10 waves in a 1.0-mm-thick soda lime glass plate. The wavelength of 40-MHz SH10 waves is 168 micrometers. The wavelength of 80-MHz SH10 waves is 95 micrometers.
Figure 10:
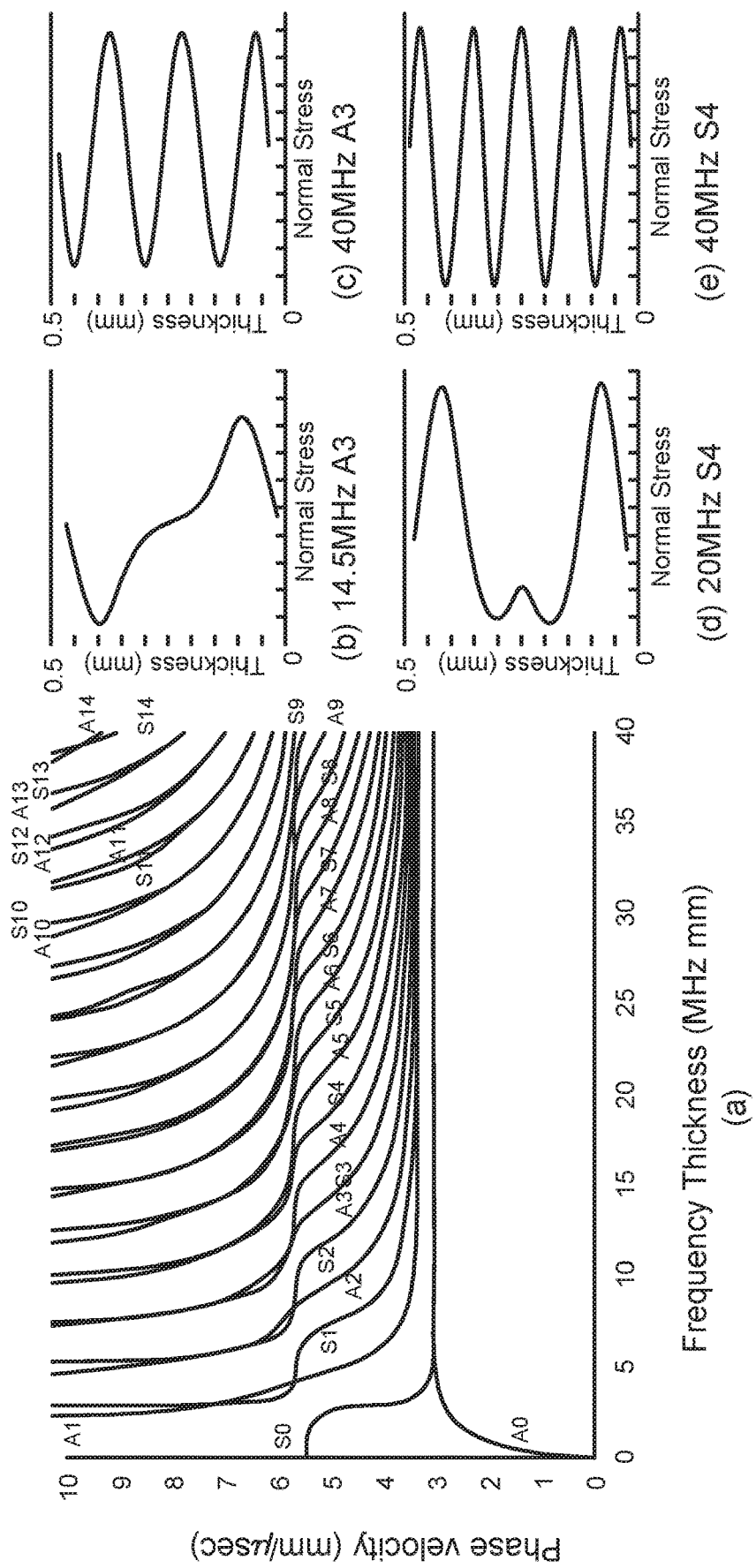
FIG. 10a depicts dispersion curves and FIGS. 10b-10e depict normal stress wave structures of Lamb waves in a 0.5-mm-thick soda lime glass plate. The material properties of soda-lime glass at 20° C. are: mass density=2.52 kg/m$^3$, Young's modulus E=72 GPa, and shear modulus G=29.8 GPa.

Specific details on how to put specific kinds of ultrasonic/acoustic energy into the plate are outlined next. Let us first consider the utilization of phase velocity, which is depicted in dispersion curves in FIG. 5. FIG. 6, a snapshot of the ultrasonic/acoustic wave travelling in a glass plate in the x direction, depicts a resulting stress diffraction grating for a wavelength of 86 micrometers for an SH0 mode at 40 MHz in a 1.0 mm thick glass plate (the thickness direction of the plate is in the y direction). The hypothesis is that light impinging onto the acousto-optical plate will undergo diffraction in desired patterns. Another possibility is shown in FIG. 7 and another for double diffraction grating result is shown in FIGS. 8 and 9. Similar results could be generated by using Lamb waves, the phase-velocity dispersion curves, and illustrative sample wave structures, which are presented in FIG. 10. Wave structures across the plate thickness can change considerably as the ultrasonic/acoustic guided-wave excitation parameters change, hence our use of the phrase "dynamic control". Wave structures could be of stress or displacement variations across the thickness. The wave structures of normal stress across the thickness are shown in FIGS. 13b-e, for 4 specific points on the phase velocity dispersion curve in FIG. 13a. To achieve a desired impact on light waves traveling in the plate, many possibilities exist with respect to changing ultrasonic/acoustic frequency and selecting the material for the plate. Optimal combinations of the ultrasonic/acoustic frequency and the plate material can be theoretically and numerically predicted and experimentally refined. If a material with a lower ultrasonic/acoustic phase velocity is used, then the electromagnetic frequency of operation can be increased. Thus, different materials as well as ultrasonic/acoustic wave modes and frequencies could be efficaciously selected. For example, if plexiglass is the material, a 30 micrometer wavelength could be achieved at 40 MHz (ultrasonic/acoustic). By proper selection of the plate material, plate thickness, type of ultrasonic/acoustic guided wave, and the frequency of the ultrasonic/acoustic wave, one-way optical devices may be created. For additional efficacy and functionality, the direction of the impinging light beam can be rotated by a fixed angle about an axis passing normally through the acousto-optical plate and parallel to the direction of thickness of the acousto-optical plate, to take advantage of any anisotropic properties of the acousto-optical plate.

Figure 11:
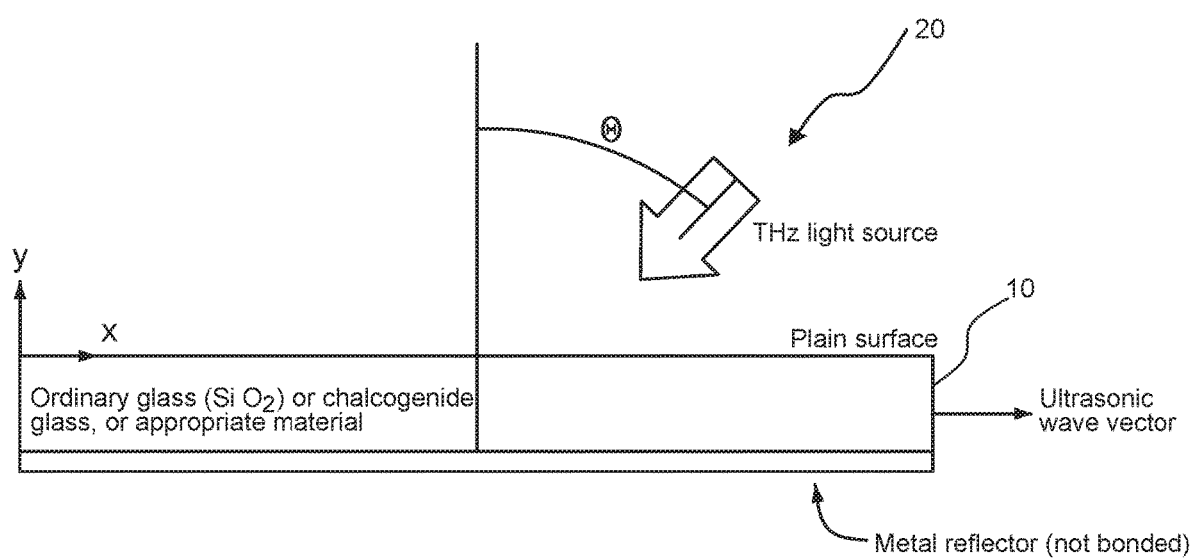
FIG. 11 is a schematic of a light beam from a light source (electromagnetic wave source 20) impinging onto a plate made of an appropriate transparent material ("ATM"). An ATM is, a material that will transmit an ultrasonic/acoustic wave (which may be in the range of 20-5000 MHz), and an electromagnetic wave (which may be in the range of 0.8-300 THz). The z direction (not shown) is normal to both the x and the y directions (shown).
Figure 12:
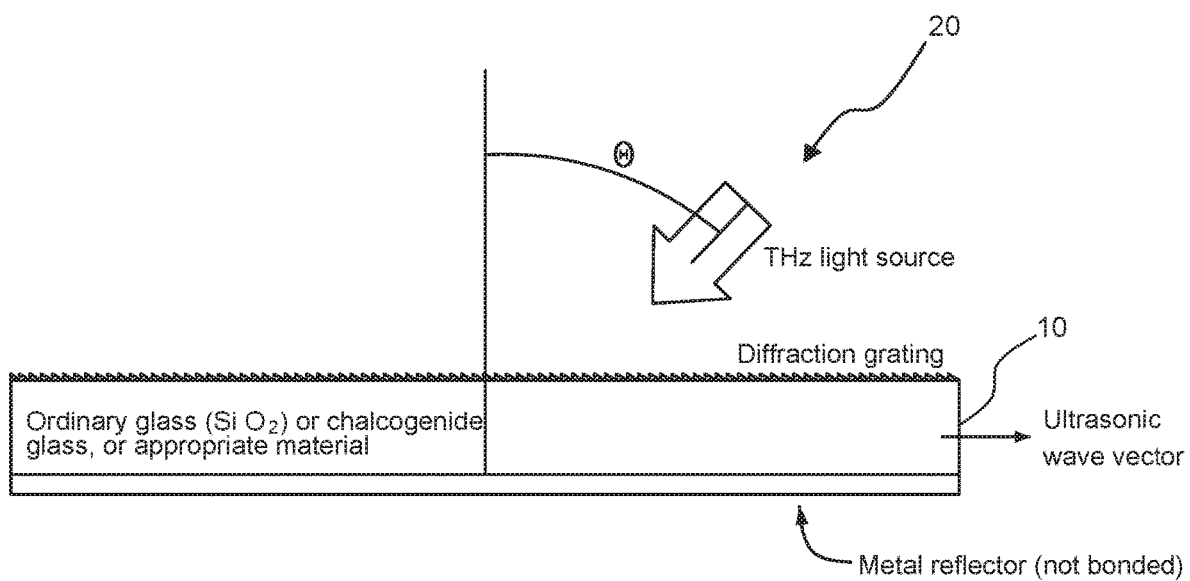
FIG. 12 is a schematic of a light beam from a light source impinging onto a plate made of an ATM, the exposed surface of the plate has been laser-textured to provide a diffraction grating.
Figure 13:
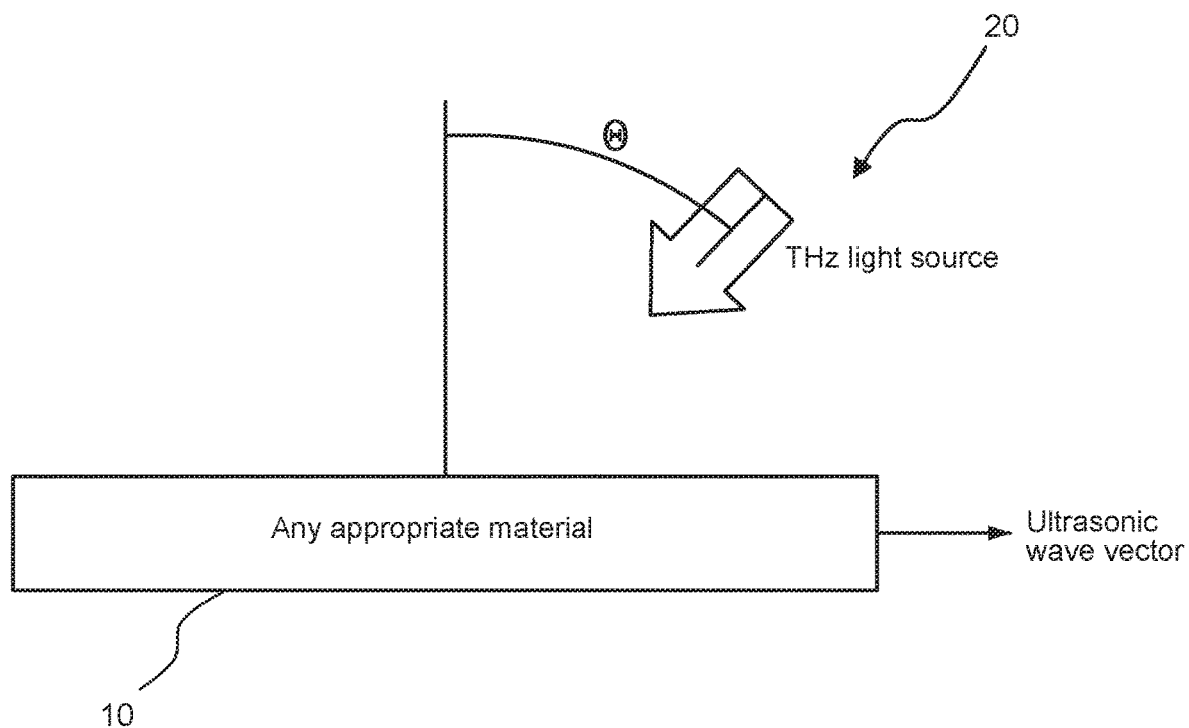
FIG. 13 is a schematic of a light beam from a light source impinging onto an ATM under dynamic control. A surface wave displacement serves as the grating. The surface wave is not shown in FIG. 13, but the surface wave propagates guided by the impinged-upon surface of the plate and its energy is confined mostly to the vicinity of that surface.

The acousto-optic effect utilizing ultrasonic/acoustic guided waves may be used to create a reflective area in the plate, and therefore left-right optical reflection asymmetry and consequently one-way optical devices. To do so, dynamic control of the ultrasonic/acoustic field may be used. FIG. 11 illustrates aspects of a one-plate-reflection concept. Such a configuration, combined with many possibilities for generating guided ultrasonic/acoustic wave fields, may be used to create left-right optical reflection asymmetry and therefore, one-way optical devices. Rather than using fixed gratings alone, the approach presented here may be based on dynamic control of the ultrasonic/acoustic field in the plate that receives impinging light, in order to alter light reflection characteristics of the plate.

In FIG. 11, a diffraction grating may be made possible by ultrasonic/acoustic guided-wave propagation potentially in both the x and y directions as a result of dynamic control of the ultrasonic/acoustic wave propagation and a specific ultrasonic/acoustic field due to mode and frequency choice. The thickness of the acousto-optical plate may be selected for maximum optical left-right reflection asymmetry (100% reflection in one direction, and 0% reflection in the other direction). Displacement in the z direction (not shown in FIG. 11) with shear horizontal (SH) waves could also be considered.

Modifications could be made to the configuration shown in FIG. 11 to improve optical left-right reflection asymmetry (leading to improved one-way optical devices). For example, a laser-micromachined grating could be added to the top surface of the plate on which the light beam impinges. See FIG. 12.

Figure 14:
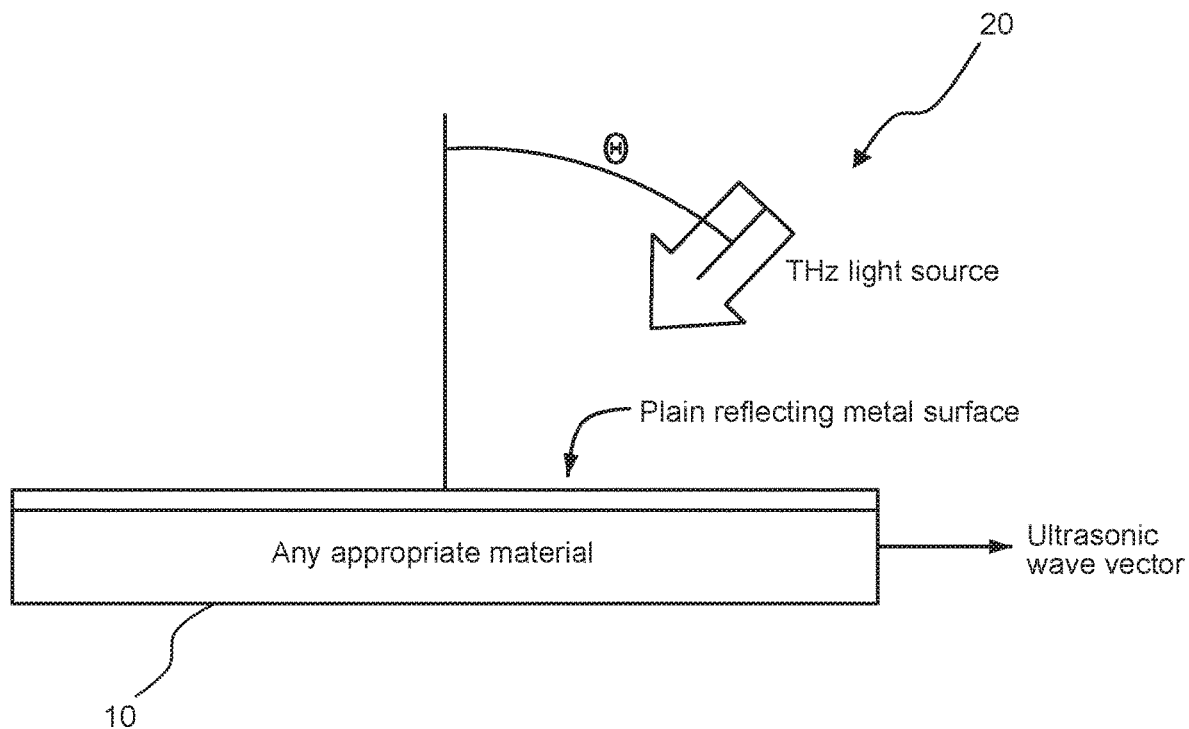
FIG. 14 is a schematic of a light beam from a light source impinging onto a plane reflector on an ATM that is dynamically controlled through the ultrasonic/acoustic wave. The thickness of the reflector is very important, because density fluctuations create the grating that diffracts light.

Surface type waves could also be introduced and then modified via dynamic control to produce desired reflections and diffraction patterns of the light rays from the plate as the light ray impinges upon the test plate containing surface waves propagation in the upper portion of the plate. See FIGS. 13 and 14.

A system is reciprocal if its measured response to a specific source remains unaltered when the locations of the source and the probe are interchanged. A lack of this symmetry can be very useful in one-way devices that attempt to make energy flow in specific channels in specific directions, as described next.

A mainstay of electronic circuits is the p-n diode in which charge carriers flow in one direction, preferentially over the reverse direction. Such a one-way charge-carrier flow allows complex circuits to exhibit pre-programmed functionalities. Miniature one-way optical devices that are in keeping with the invention may function, in essence, as photonic diodes. If coupled to polarization filters and/or bandpass/bandstop filters, such optical diodes could be used to reduce back-scattering noise as well as instabilities in optical communication networks. Sharper 2D and 3D images may be enabled for microscopy and tomography to facilitate process control and delicate surgeries. On-chip implementation may facilitate integration with electronics and improve the wireless communications between Internet devices. Thus, inexpensive bidirectional asymmetry in optics may have a transformative impact on everyday life.

Linear materials may be classified as either Lorentz reciprocal or nonreciprocal, based on the satisfaction of certain constraints by their constitutive tensors. Specifically, the permittivity tensor of a Lorentz-nonreciprocal dielectric material must not be symmetric. Nonreciprocity typically requires the deployment of a strong magnetostatic field, e.g., with ferrites in microwave circuits or the magneto-optical effect. Nonlinear effects also may be employed in optical isolators. Use of a magnetostatic field or a non-linear material may yield bidirectional asymmetry, but may be either energy intensive or difficult to implement on chip, indicating that novel routes for bidirectional asymmetry (that may or may not be based on Lorentz nonreciprocity) may be beneficial for transformative progress in optics.

Some embodiments of our invention aim to introduce left-right reflection asymmetry in optics through dynamic asymmetric excitation of ultrasonic/acoustic guided waves. Guided waves may be of two types: (i) surface waves and (ii) bulk waveguide Lamb-type or Shear Horizontal modes. Dynamically controlled excitation of guided ultrasonic/acoustic waves enables the introduction of a left-right optical reflection asymmetry via constitutive properties (including ultrasonic/acoustic properties such as the compliance tensor and the mass density; electromagnetic properties such as the frequency-dependent relative permittivity tensor; and the acousto-optic properties captured via 3×6 matrix in the Kelvin notation) of the material, along the propagation direction in the acousto-optical plate. This asymmetry in the constitutive properties of the acousto-optical plate can be accentuated through asymmetric corrugations of a diffracting interface as in blazed gratings. The coupling of a guided ultrasonic/acoustic wave to incident light may be manifested as a sharp increase in optical absorptance, which may translate into sharp reductions in certain optical remittances.

Within the terahertz regime of electromagnetic waves, it is believed the invention may be used to realize significant benefits of the left-right reflection asymmetry for such applications as power electronics, imaging, spectroscopy, biological and chemical sensing, cancer detection, high-temperature superconductor characterization, underwater sensing/imaging, high-speed wireless transmission for data, energy transport, and bomb detection, among others.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A system for creating a diffraction grating, comprising:
an acousto-optical wave conductor backed by a metallic reflector;
an electromagnetic wave source arranged to provide to the acousto-optical wave conductor an electromagnetic wave having a frequency of between 0.8 and 300 THz;
an ultrasonic/acoustic wave generator arranged to provide to the acousto-optical wave conductor an ultrasonic guided wave propagating at an orientation different from the electromagnetic wave, and having a frequency of between 20 and 5000 MHz; and
the reflector is positioned to reflect the electromagnetic wave.

2. The system of claim 1, wherein the ultrasonic/acoustic wave generator is arranged to cause the ultrasonic guided wave to have a propagation-direction that is transverse to a propagation-direction of the electromagnetic wave.

3. The system of claim 1, wherein the electromagnetic wave is permitted to propagate through the acousto-optical wave conductor in a first direction, but not in a second direction.

4. The system of claim 1, wherein the electromagnetic wave has a frequency of between 0.8 and 6 THz, and the ultrasonic guided wave has a frequency of between 20 and 100 MHz.

5. The system of claim 4, wherein the electromagnetic wave has a frequency of between 0.8 and 3.0 THz, and the ultrasonic guided wave has a frequency of between 20 and 50 MHz.

6. The system of claim 1, wherein the electromagnetic wave has a frequency of between 6 and 30 THz, and the ultrasonic guided wave has a frequency of between 100 and 500 MHz.

7. The system of claim 1, wherein the electromagnetic wave has a frequency of between 30 and 300 THz, and the ultrasonic guided wave has a frequency of between 500 and 5000 MHz.

8. The system of claim 1, wherein the ultrasonic guided wave is a Rayleigh surface wave.

9. The system of claim 1, wherein the ultrasonic guided wave is a Lamb-type wave.

10. The system of claim 1, wherein the ultrasonic guided wave is a shear-horizontal guided wave.

11. The system of claim 1, wherein the ultrasonic guided wave generator is an angle-beam excitor.

12. The system of claim 1, wherein the ultrasonic guided wave generator is a comb excitor.

13. The system of claim 1, wherein dynamic control of the ultrasonic guided wave is used to selectively alter an ability of the acousto-optical wave conductor to conduct the electromagnetic wave.

14. The system of claim 1, wherein dynamic control of the ultrasonic guided wave is used to selectively cause density variations in the acousto-optical wave conductor in order to reflect, refract, or diffract the electromagnetic wave.

15. The system of claim 1, wherein a surface of the acousto-optical wave conductor that receives the electromagnetic wave is textured in a periodic way along one direction.

16. The system of claim 1, wherein a surface of the acousto-optical wave conductor that receives the electromagnetic wave is textured in a periodic way along two mutually orthogonal directions.

17. The system of claim 1, wherein a surface of the acousto-optical wave conductor that receives the electromagnetic wave is textured in a periodic way along one direction.

18. The system of claim 1, wherein a surface of the acousto-optical wave conductor that receives the electromagnetic wave is textured in a periodic way along two mutually orthogonal directions.

19. A method of creating a diffraction grating, comprising:
providing an acousto-optical wave conductor backed by a metallic electromagnetic wave reflector;
providing an electromagnetic wave to the acousto-optical wave conductor, the electromagnetic wave having a frequency of between 0.8 and 300 THz;
providing an ultrasonic guided wave to the acousto-optical wave conductor, the ultrasonic guided wave propagating at an orientation different from the electromagnetic wave, and having a frequency of between 20 and 5000 MHz in order to alter the optical-reflection characteristics of the acousto-optical wave conductor.

20. The method of claim 19, wherein the ultrasonic guided wave is caused to propagate in a direction that is transverse to a propagation-direction of the electromagnetic wave.

21. The method of claim 19, wherein the electromagnetic wave is permitted to propagate through the acousto-optical wave conductor in a first direction, but not in a second direction.

22. The method of claim 19, wherein the electromagnetic wave has a frequency of between 0.8 and 6 THz, and the ultrasonic guided wave has a frequency of between 20 and 100 MHz.

23. The method of claim 22, wherein the electromagnetic wave has a frequency of between 0.8 and 3.0 THz, and the ultrasonic guided wave has a frequency of between 20 and 50 MHz.

24. The method of claim 19, wherein the electromagnetic wave has a frequency of between 6 and 30 THz, and the ultrasonic guided wave has a frequency of between 100 and 500 MHz.

25. The method of claim 19, wherein the electromagnetic wave has a frequency of between 30 and 300 THz, and the ultrasonic guided wave has a frequency of between 500 and 5000 MHz.

26. The method of claim 19, wherein the ultrasonic guided wave is a Rayleigh surface wave.

27. The method of claim 19, wherein the ultrasonic guided wave is a Lamb-type wave.

28. The method of claim 19, wherein the ultrasonic guided wave is a shear-horizontal guided wave.

29. The method of claim 19, wherein the ultrasonic guided wave generator is an angle-beam excitor.

30. The method of claim 19, wherein the ultrasonic guided wave generator is a comb excitor.

31. The method of claim 19, wherein the ultrasonic guided wave is dynamically controlled to selectively alter the ability of the acousto-optical wave conductor to allow the electromagnetic wave to propagate through it.

32. The method of claim 19, wherein the ultrasonic guided wave is dynamically controlled to selectively cause density variations in the acousto-optical wave conductor in order to reflect, refract, or diffract the electromagnetic wave.

33. The method of claim 19, wherein a surface of the acousto-optical wave conductor that receives the electromagnetic wave is textured in a periodic way along one direction.

34. The method of claim 19, wherein a surface of the acousto-optical wave conductor that receives the electromagnetic wave is textured in a periodic way along two mutually orthogonal directions.

* * * * *